(12) United States Patent
Suarez-Seminario et al.

(10) Patent No.: US 9,762,100 B2
(45) Date of Patent: Sep. 12, 2017

(54) ELECTRIC MACHINE HAVING AN AXIAL SPRING ELEMENT

(75) Inventors: Dariusz Suarez-Seminario, Achern (DE); Frank Richter, Lauf (DE)

(73) Assignee: Robert Bosch GmbH, Stuttgart (DE)

( * ) Notice: Subject to any disclaimer, the term of this patent is extended or adjusted under 35 U.S.C. 154(b) by 881 days.

(21) Appl. No.: 14/119,165

(22) PCT Filed: Mar. 21, 2012

(86) PCT No.: PCT/EP2012/054928
§ 371 (c)(1),
(2), (4) Date: Nov. 20, 2013

(87) PCT Pub. No.: WO2012/159798
PCT Pub. Date: Nov. 29, 2012

(65) Prior Publication Data
US 2014/0103764 A1    Apr. 17, 2014

(30) Foreign Application Priority Data
May 20, 2011   (DE) ........................ 10 2011 076 159

(51) Int. Cl.
*H02K 5/16* (2006.01)
*F16C 25/08* (2006.01)
(Continued)

(52) U.S. Cl.
CPC ............. *H02K 5/16* (2013.01); *F16C 25/083* (2013.01); *F16F 1/26* (2013.01); *H02K 5/1732* (2013.01);
(Continued)

(58) Field of Classification Search
CPC ........... F16C 25/083; F16F 1/26; F16F 1/326; H02K 5/16; H02K 5/1732; H02K 15/00; H02K 7/00; H02K 7/083
(Continued)

(56) References Cited

U.S. PATENT DOCUMENTS 2,448,500 A * 8/1948 Turner ...................... B65B 3/32
310/407
3,966,278 A * 6/1976 Lewis ................... F16C 23/045
384/204

(Continued)

FOREIGN PATENT DOCUMENTS

CN        1949631      4/2007
CN      101043162      9/2007
(Continued)

OTHER PUBLICATIONS

International Search Report for Application No. PCT/EP2012/054928 dated Nov. 28, 2012 (English Translation, 3 pages).

*Primary Examiner* — Tran Nguyen
(74) *Attorney, Agent, or Firm* — Michael Best & Friedrich LLP

(57) ABSTRACT

The invention relates to an axial spring element (6) having two peripheral ring elements (61, 62) that are spaced from one another in the axial direction and are connected to one another in a spring-elastic manner, wherein at least one of the ring elements (61) comprises one or more retaining elements (64) in order to brace the spring element with a rotor (5) and thereby hold the spring element on the rotor (5).

6 Claims, 5 Drawing Sheets

(51) Int. Cl.
*F16F 1/26* (2006.01)
*H02K 15/00* (2006.01)
*H02K 5/173* (2006.01)

(52) U.S. Cl.
CPC .......... *H02K 15/00* (2013.01); *F16C 2380/26* (2013.01); *H02K 5/173* (2013.01); *Y10T 29/49012* (2015.01)

(58) Field of Classification Search
USPC .......................................................... 310/91
See application file for complete search history.

(56) References Cited

U.S. PATENT DOCUMENTS

| | | | |
|---|---|---|---|
| 4,634,298 A * | 1/1987 | Crawford | F16C 23/045 384/209 |
| 5,939,807 A | 8/1999 | Patyk et al. | |
| 5,959,381 A * | 9/1999 | Fischer | H02K 7/083 310/90 |
| 2005/0012417 A1 * | 1/2005 | Fasterding | H02K 5/1732 310/90 |
| 2007/0257569 A1 * | 11/2007 | Heyder | F16F 1/326 310/66 |

FOREIGN PATENT DOCUMENTS

| | | |
|---|---|---|
| CN | 201260101 | 6/2009 |
| DE | 20307984 | 7/2003 |
| DE | 102004041074 | 3/2006 |
| JP | 2000308305 | 11/2000 |
| WO | 0116499 | 3/2001 |
| WO | 03083319 | 10/2003 |

* cited by examiner

ELECTRIC MACHINE HAVING AN AXIAL SPRING ELEMENT

BACKGROUND OF THE INVENTION

The invention relates in general to rotary electric machines, in particular electric machines in which an axial spring element is arranged between the rotor body and the bearing of the rotor shaft.

In electric machines having an internal rotor, a rotor body which bears a rotor armature is generally arranged on a rotor shaft. The rotor shaft is mounted in a housing of the electric machine by means of corresponding ball bearings.

Document JP 2000 30 8305 A also discloses that arranged between a ball bearing and the rotor body on the rotor shaft is a washer which supports the rotor axially with respect to the ball bearing. In this context, the washer is embodied as a spring element with a ring part on which radially protruding spring parts are integrally formed, said spring parts being supported in a sprung fashion on the rotor armature. Document DE 2004 041 074 A1 discloses an electric machine in which the axial spring element is fixedly attached to the rotor armature.

SUMMARY OF THE INVENTION

According to the invention, an axial spring element for a rotary electric machine and an electric machine and a method for assembling the electric machine are provided.

According to a first aspect, an axial spring element is provided with two peripheral ring elements which are spaced apart from one another in the axial direction and are connected to one another in a spring-elastic fashion, wherein at least one of the ring elements comprises one or more retaining elements in order to brace the spring element with a rotor and thereby retain the spring element on the rotor.

An idea of the axial spring element above is to ensure secure and at the same time simple and robust mounting of the spring element when an electric machine is constructed. In the known prior art, it was necessary to make structural interventions into the design of the rotor, in particular of the rotor body, in order to secure the axial spring element fixedly on the rotor body. This lead to expenditure incurred for the change and/or to increases in the expenditure for the design of the components relating to the rotor, in particular the rotor body. The above axial spring element therefore provides that it can be connected to the rotor without structural interventions into rotor bodies or the rotor shaft being necessary. However, at the same time it is ensured that the axial spring element can also be applied to the vertical rotor shaft and connected to the rotor in such a way that it cannot become detached from the rotor.

For this purpose, the axial spring element provides, on its outer part, sprung retaining elements which are secured by a press fit to the rotor, in particular to an insulating lamination of the rotor body or of the rotor shaft. As a result, the spring element can be secured axially without having to change rotor components. Furthermore, the elastic retaining elements have the advantage that tolerances due to manufacture and mounting can be compensated. As a result of the clamping connection between the retaining elements of the spring element and the rotor, acceleration forces of the rotor can be transmitted directly to the spring element, with the result that a relative movement in the form of a slip between the rotor and the spring element is no longer possible during the operation of the motor.

It is also possible to provide that the one or more retaining elements is/are each embodied with a retaining claw which protrudes outward in the radial direction from the respective ring element.

Furthermore, the one or more retaining elements can each be embodied with a retaining claw which protrudes inward in the radial direction from the respective ring element.

According to a further embodiment, the ring element on which the one or more retaining elements is/are arranged can be larger than a further ring element of the ring elements, and wherein the corresponding retaining claws protrude obliquely in the direction of the further ring element.

According to a further aspect, an electric machine is provided, in particular for use in a motor vehicle, comprising:
 a rotor with a rotor shaft and a rotor body arranged thereon;
 a housing part with a bearing for accommodating the rotor shaft of the rotor;
 an elastic spring element according to the invention, and which is arranged between the bearing and the rotor body on the rotor shaft;
 wherein the spring element comprises, at its end facing the rotor body, one or more retaining elements in the axial direction, with which one or more retaining elements the end facing the rotor body can be braced in such a way that the spring element is held on the rotor body.

Furthermore, the rotor body can be provided with a cylindrical internal recess into which the spring element is inserted.

It is also possible to provide that the internal recess is formed by a hollow cylindrical insulating lamination on which an armature packet composed of armature laminations is applied.

According to a further aspect, a method for mounting an electric machine is provided, wherein before a rotor is inserted into a housing part the above spring element is fitted onto a rotor shaft of the rotor, at least until the retaining element or elements secures/secure the spring element against dropping out, and wherein the rotor is subsequently inserted with the spring element into the housing part, with the result that the rotor shaft is retained by the bearing.

BRIEF DESCRIPTION OF THE DRAWINGS

Preferred embodiments of the present invention are explained in more detail below with reference to the appended drawings, in which.

DETAILED DESCRIPTION

Figure 1:
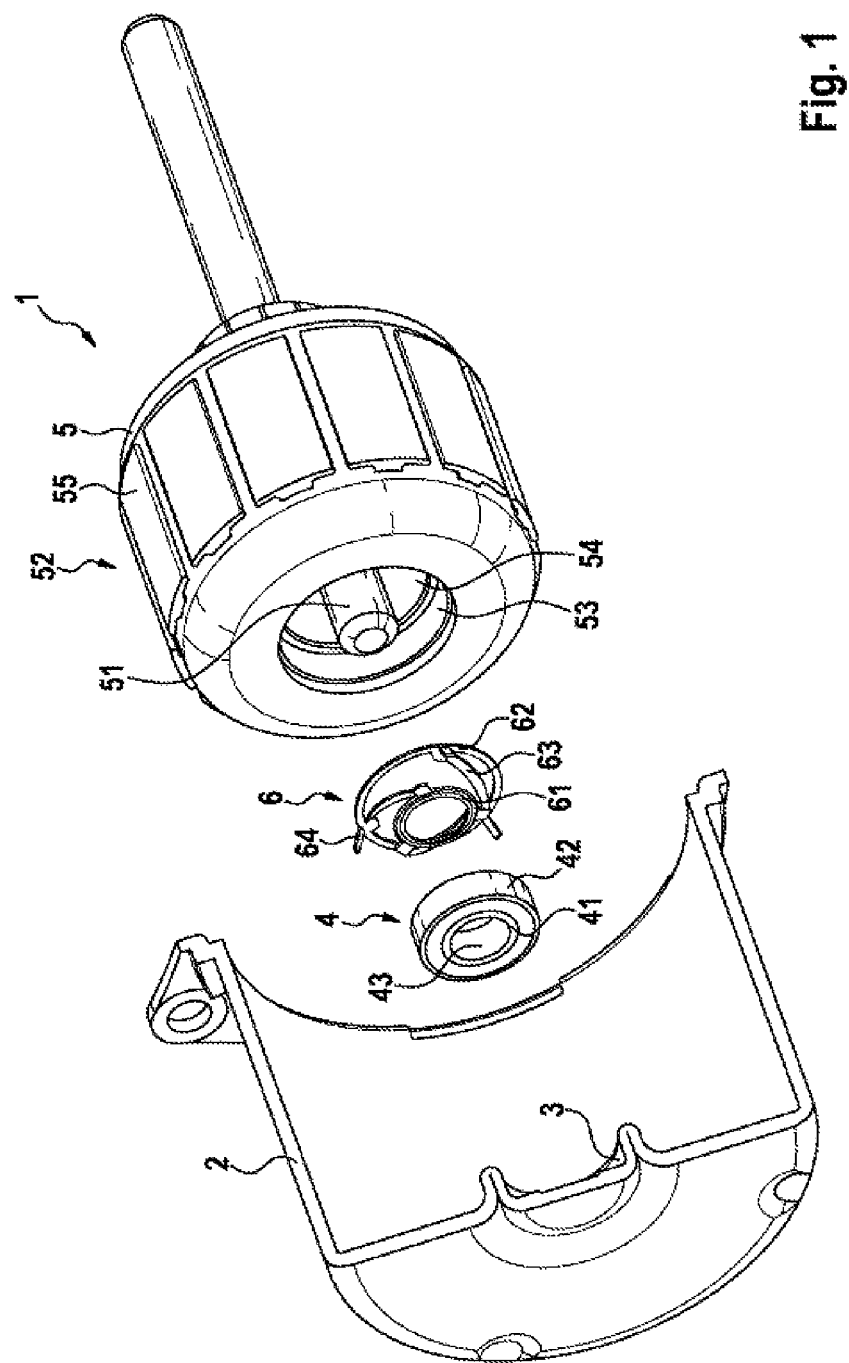
FIG. 1 shows an exploded illustration of an electric machine.

FIG. 1 illustrates a perspective exploded illustration of a part of an electric machine 1. In the present exemplary embodiment, the electric machine 1 corresponds to an internal rotor electric motor. The electric machine 1 comprises a housing part 2, which is embodied as a pole pot. The pole pot can be embodied in one piece from a metallic material, for example by deep drawing or comparable manufacturing methods.

The housing part 2 has at its front-side end a circular-cylindrical recess 3 in which a bearing 4 in the form of a ball bearing or roller bearing can be accommodated. In the mounted state, the bearing 4 is accommodated completely or partially in the recess 3 and retained against slipping at least in the radial direction by the peripheral wall of the recess 3. The bearing 4 is embodied in a conventional way with an internal part 41 and an external part 42 which are arranged in a rotational fashion with respect to one another by means of rollers or balls (not shown). The internal part 41 has a through-opening 43 which is concentric with respect to the external circumference of the bearing 4.

A rotor 5 is also provided which has a rotor body 52 on a rotor shaft 51. The rotor body 52 also comprises a rotor armature 55 which is attached to the rotor shaft 51. An essentially cylindrical insulating part 53, which defines an essentially circular-cylindrical internal recess 54, can be provided between the rotor shaft 51 and the rotor armature 52. The rotor armature 52 is embodied, for example, as a lamination packet which is fitted onto the insulating part 53.

An elastic spring element 6 is arranged between the bearing 4 and the rotor 5 in order to brace the rotor shaft 51 axially with respect to the bearing 4. The spring element 6 is supported, on the one hand, on the internal part 41 of the bearing 4 and, on the other hand, on the rotor body 52.

Figure 2A:
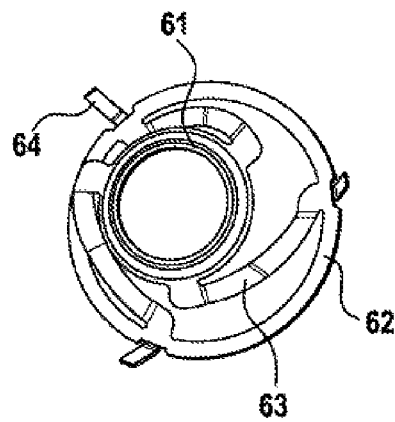
FIGS. 2A to 2C show views of the axial spring element according to one embodiment.
Figure 2B:
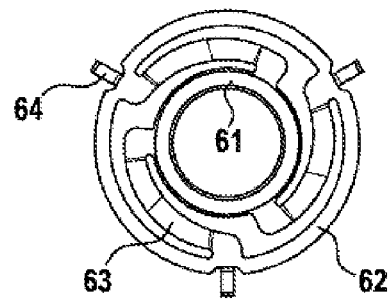
Figure 2C:
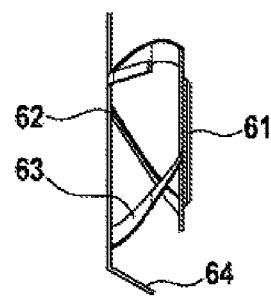

As is shown in the views in FIGS. 2a to 2c, the spring element 6 has an internal ring 61 and an external ring 62 which are embodied concentrically with respect to the receptacle of the rotor shaft 51 and are offset axially with respect to one another. The internal ring 61 and the external ring 62 are connected to one another by means of webs 63 which are helical or at least arranged obliquely with respect to the radial direction. The webs 63 are embodied in such a way that they enable an axially sprung displacement of the internal ring 61 and of the external ring 62 with respect to one another in order to make available spring travel in the axial direction. In the exemplary embodiment shown, three webs 63 are provided, but the number of webs 63 is essentially random, provided that the axial spring mounting between the internal ring 61 and the external ring 62 is ensured.

The axial spring element 6 is manufactured, for example, as a punched bend part composed of spring steel and can have depressions in a suitable form in order to prevent bending of the internal ring 61 or of the external ring 62.

In the embodiment shown in FIGS. 2a to 2c, the external ring 62 has retaining claws 64, protruding on its outer circumference, as elastic retaining elements with which the spring element 6 can be pressed into the internal recess 54, with the result that the retaining claws 64 press against a peripheral internal wall of the internal recess 54 and thereby secure the spring element 6 against dropping out from the internal recess 54. In the non-mounted state, the external ends of the retaining claws 64 define a diameter which is larger than the diameter of the rotor shaft 51.

The retaining claws 64 are preferably arranged distributed around the circumferential direction of the external ring 62. The number of the retaining claws 64 is preferably three, but it is also possible to provide only two or more than three retaining claws 64.

The retaining claws 64 preferably protrude outward in the radial direction and obliquely in the direction of the internal ring 61, i.e. in the direction of the bearing 4. In this way, during the mounting of the electric machine 1 it is easily possible to fit the spring element 6 into the rotor recess 54 until the retaining claw 64 is braced with the internal surface of the insulating part 53 and thereby ensures the reliable seat of the spring element 6.

Figure 3:
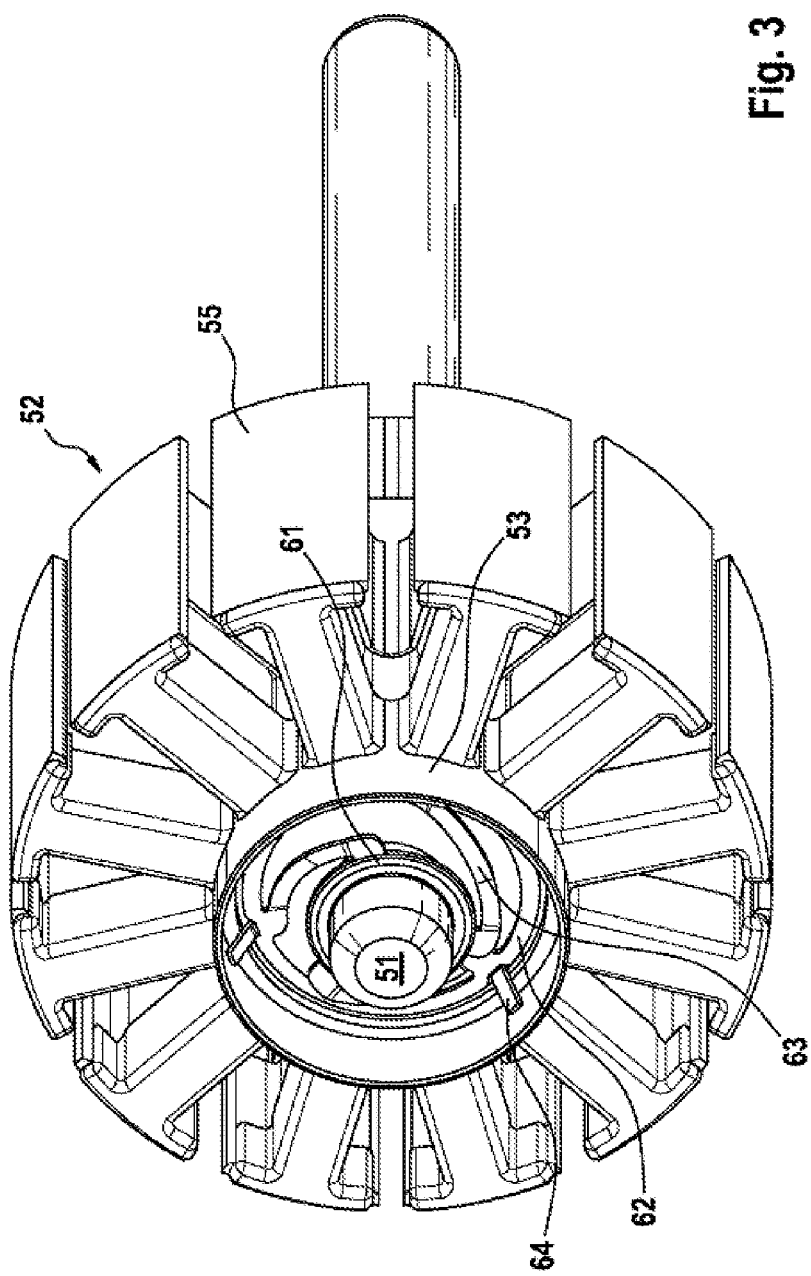
FIG. 3 shows a perspective illustration of a rotor with an inserted spring element.
Figure 4:
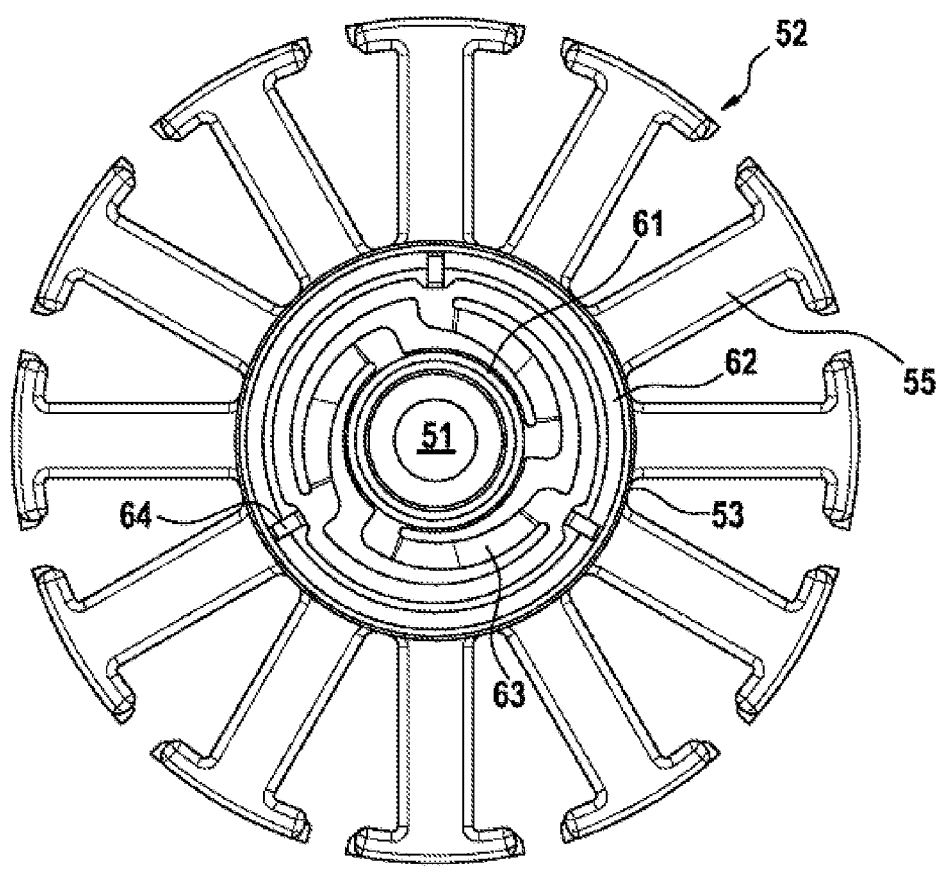
FIG. 4 shows a plan view in an axial direction of the rotor with an inserted spring element.

Various views of a spring element 6 which has been introduced into the internal recess 54 of the rotor 5 are illustrated in FIGS. 3 and 4. It is clear that the external ends of the retaining claw 64 rest on the internal wall of the internal recess 54 and thereby retain the spring element 6 concentrically with respect to the rotor shaft 51.

In order to mount the electric machine 1, the axial spring element 6 is secured at least axially on the pre-mounted rotor 5 by pushing it into the internal recess 54. The spring element 6 is reliably retained on the rotor 5 by the retaining claws 64, with the result that the rotor 5 can also be inserted upside down by means of what is referred to as blind mounting into the bearing 4 which has been mounted in the housing part 2. The axial prestress of the spring element 6 can be adjusted on the basis of the axial mounting force. When thermal expansion occurs during operation, the rotor body 52 can be displaced with respect to the housing part 2 while maintaining an axial clamping force, without the spring element 6 being able to become tilted on the rotor shaft 51.

Figure 5:
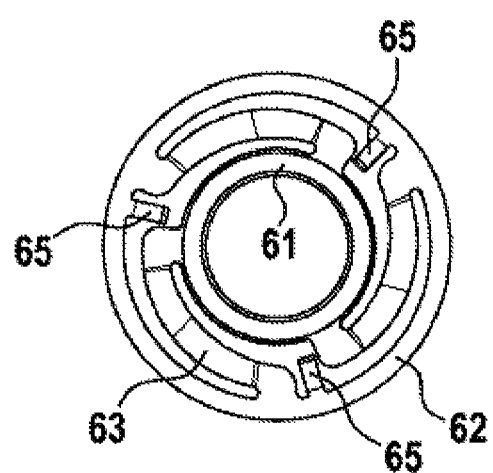
FIG. 5 shows a view of the axial spring element according to a further embodiment.

According to a further embodiment which is illustrated in FIG. 5, the retaining elements can also be embodied in the form of retaining claws 65 which extend inward in the radial direction and which are arranged on the external ring 62. In this embodiment the retaining claws are also preferably embodied running obliquely in the direction of the internal ring 61. In the non-mounted state, the internal ends of the retaining claws 65 define a diameter which is smaller than the diameter of the rotor shaft 51. In this case, during mounting the retaining claws 65 may brace with the rotor shaft 51.

The invention claimed is:
1. An electric machine (1), comprising:
a rotor (5) with a rotor shaft (51) and a rotor body (52) arranged thereon;
a housing part (2) with a bearing (4) accommodating the rotor shaft (51) of the rotor (5);
an elastic spring element (6) having an internal ring element (61) and an external ring element (62) larger than the internal ring element (61) and spaced in an axial direction from the internal ring element (61), wherein the internal and external ring elements (61, 62) are connected to one another in a spring-elastic fashion, wherein the external ring element (62) comprises one or more retaining elements (64) and each of the one or more retaining elements (64) is embodied with a retaining claw that protrudes in an outward radial direction from the external ring element (62), the elastic spring element (6) being arranged between the bearing (4) and the rotor body (52) on the rotor shaft (51);
wherein the one or more retaining elements (64) are provided at an end of the spring element (6) facing the rotor body (52), and wherein with the one or more retaining elements (64), the end of the spring element (6) facing the rotor body (52) is braced in such a way that the spring element (6) holds itself onto the rotor (5) by engagement of the one or more retaining elements (64) with an internal recess (54) of the rotor body (52).
2. The electric machine (1) as claimed in claim 1, wherein the one or more retaining elements (64) of the spring element (6) are engaged with an internal wall of the internal recess (54).

3. The electric machine (1) as claimed in claim 2, wherein the internal recess (54) is formed by a hollow cylindrical insulating part (53), and wherein an armature packet composed of armature laminations is applied onto the insulating part (53).

4. A method for mounting an electric machine (1), the method comprising:
   providing a rotor (5) with a rotor shaft (51) and a rotor body (52) arranged thereon;
   providing a housing part (2) with a bearing (4) for accommodating the rotor shaft (51) of the rotor (5);
   providing an elastic spring element (6) having an internal ring element (61) and an external ring element (62) larger than the internal ring element (61) and spaced in an axial direction from the internal ring element (61), wherein the internal and external ring elements (61, 62) are connected to one another in a spring-elastic fashion, wherein the external ring element (62) comprises one or more retaining elements (64) and each of the one or more retaining elements (64) is embodied with a retaining claw that protrudes in an outward radial direction from the external ring element (62);
   prior to insertion of the rotor (5) into the housing part (2), fitting the spring element (6) onto the rotor shaft (51) of the rotor (5), at least until the one or more retaining elements (64) protruding radially outward from the external ring element (62) secures/secure the spring element (6) against dropping out by engagement of the one or more retaining elements (64) with an internal recess (54) of the rotor (5), and
   following the engagement of the one or more retaining elements (64) with the internal recess (54) of the rotor (5), inserting the rotor (5) with the spring element (6) into the housing part (2) until the rotor shaft (51) is retained by a bearing (4).

5. An axial spring element (6) having two peripheral ring elements (61, 62) which are spaced apart from one another in an axial direction and are connected to one another in a spring-elastic fashion, the two peripheral ring elements including an internal ring element (61) and an external ring element (62) larger than the internal ring element (61), wherein at least one ring element (62) of the two peripheral ring elements (61, 62) comprises one or more retaining elements (64) in order to brace the spring element with a rotor (5) and thereby retain the spring element on the rotor (5), wherein each of the one or more retaining elements (64) is embodied with a retaining claw that protrudes in an outward radial direction from the external ring element (62).

6. The spring element (6) as claimed in claim 5 wherein each of the one or more retaining elements (64) protrudes obliquely in a direction of the internal ring element (61).

* * * * *